United States Patent [19]
Delavaux et al.

[11] Patent Number: 5,404,413
[45] Date of Patent: Apr. 4, 1995

[54] OPTICAL CIRCULATOR FOR DISPERSION COMPENSATION

[75] Inventors: Jean-Marc P. Delavaux, Wescosville; Kinichiro Ogawa, Lower Macungie Township, Lehigh County, both of Pa.

[73] Assignee: AT&T Corp., Murray Hill, N.J.

[21] Appl. No.: 168,722

[22] Filed: Dec. 14, 1993

[51] Int. Cl.$^6$ ............................................. G02B 6/28
[52] U.S. Cl. .................... 385/15; 359/173; 359/188; 359/193; 359/195; 359/341; 359/495; 359/499; 385/123
[58] Field of Search ............. 359/160, 161, 173, 188, 359/193, 195, 341, 345, 495, 499; 385/15, 123

[56] References Cited

U.S. PATENT DOCUMENTS

| | | | |
|---|---|---|---|
| 4,606,605 | 8/1986 | Ashkin et al. | 385/15 |
| 4,830,451 | 5/1989 | Stone | 356/352 |
| 4,953,939 | 9/1990 | Epworth | 359/173 |
| 4,991,938 | 2/1991 | Buhrer et al. | 359/499 |
| 5,023,947 | 6/1991 | Cimini, Jr. et al. | 356/352 |
| 5,202,791 | 4/1993 | Kaede | 359/345 |

OTHER PUBLICATIONS

"All-Optical, Fiber-Based 1550 nm Dispersion Compensation in a 10 Gbit/s, 150 km Transmission Experiment over 1310 nm Optimized Fiber", J. M. Dugan et al., Alcatel Network Systems, Inc., A. J. Antos et al., Opto-Electronic Group, Corning Incorporated, *OFC 92*, San Jose, Calif., pp. 367-370, 1992 (no month available).

"High Performance Dispersion-Compensating Fiber and its Application to Upgrading of 1.31 μm Optimized System", M. Onishi et al., Sumitomo Electric Industries, Ltd., *ECOC 93*, Montreux, Switzerland, (4 pages), 1993, no month available.

"The Realization of Broad-Band Dispersion Compensation using the Multicladding Waveguide Structure", A. V. Belov et al., General Physics Institute, Russian Academy of Sciences, A. N. Guryanov et al., Institute of Chemistry of High Purity Substances, Russian Academy of Sciences, *ECOC 93*, Montreaux, Switzerland, (4 pages), 1993, no month available.

"Dispersion Compensation with Optical Ring Resonator in Coherent Optical Transmission Systems", Shigeki Kitajima et al., Central Research Laboratory, Hitachi Ltd., *ECOC 93*, Montreaux, Switzerland, (4 pages), 1993, no month available.

"Improvement in In-Line Amplifier Transmission Distance with Group-Velocity-Dispersion Compensation", Akira Naka and Shigeru Saito, NTT Transmission Systems Laboratories, *Optical Amplifiers & Their Applications*, Jul. 4-6, Yokohama, Japan, 1993, pp. 30-33.

*Primary Examiner*—Frank Gonzalez
*Attorney, Agent, or Firm*—Richard D. Laumann

[57] ABSTRACT

Dispersion compensation is achieved in an optical communications system by using an optical circulator with first, second, and third ports. The first and third ports are connected to system optical fibers. The second port is connected to a dispersion compensating fiber and return means. The signal passes through the dispersion compensating fiber twice permitting shorter dispersion compensating fibers to be used than were previously used. A Faraday rotator may be used compensate for the polarization mode dispersion of the fiber.

21 Claims, 4 Drawing Sheets

OPTICAL CIRCULATOR FOR DISPERSION COMPENSATION

TECHNICAL FIELD

This invention relates generally to the field of optical communications and particularly to optical communications which compensates for dispersion such as that in optical fibers.

Background of the Invention

Optical communications systems using optical fibers to couple a light source, such as a laser, and a photodetector are now widely used for high speed, for example, Gbit/sec data rates, and long distance, for example, trans-Atlantic or trans-Pacific, communications. Many technical problems had to be overcome for these systems to reach their present state of development. Perhaps the most widely known problem was caused by the lossy nature of the first silica based optical fibers. The loss in such fibers was greatly reduced, to the order of a tenth of a dB/km or even less, by the development of fibers fabrications techniques that greatly reduced the presence of loss creating impurities in the fibers.

After low loss optical fibers had been developed, other system parameters became important to the further development of optical communications systems. For example, fibers have chromatic dispersion; that is, the propagation velocity of the radiation depends upon its frequency. Narrow band light sources in the form of solid state lasers were developed. These lasers typically radiated in several relatively closely spaced modes which propagated at different velocities. The presence of multiple modes and the existence of chromatic dispersion, limited either the data transmission rate or the transmission distance. Radiation sources, such as distributed feedback(DFB) lasers, that emitted only a single mode were developed to overcome these problems.

However, even the single mode of lasers has a finite linewidth which caused a pulse to spread when chromatic dispersion was present. One approach to solving this problem developed dispersion shifted fibers which arc often referred to by the acronym DSF. Dispersion shifted fibers have a region of very low or no chromatic dispersion. However, the use of such fibers suffers from several drawbacks. First, the laser must be selected so that it emits at the frequency at which the fiber has no chromatic dispersion. Second, much non-dispersion shifted fiber has already been installed.

Other techniques that compensate for fiber chromatic dispersion are desirable if they overcome the previously discussed limitations imposed by non-dispersion shifted fibers. One technique inserts, at an arbitrary point in the transmission path between the transmitter and receiver, a dispersion compensating fiber (DCF). The length of fiber is selected to provide dispersion compensation over a transmission length L1 and therefore enable transmission over either an extended distance or at a higher data rate. This approach suffers from the added costs of the DCF and, more significantly, the losses introduced by such fibers. These losses are significantly higher than the losses in the system fibers and limit system capabilities.

Optical systems using dispersion compensation have been discussed in the recent literature. See, for example, Dugan et al, pp. 367-370, OFC, San Jose, Calif., 1992; Onishi et al, ECOC, Montreux, Switzerland, 1993; Belov et al, ECOC, Montreux, Switzerland, 1993; Katijima et al, ECOC, Montreux, Switzerland, 1993; and Naka et al, pp. 30-33, Optical Amplifiers and their Applications, Jul. 4-6, 1993, Yokohama, Japan, for reports of recent developments.

SUMMARY OF THE INVENTION

According to an exemplary embodiment of this invention, an optical communications system has a transmitter, a receiver, and first and second optical fibers connected to the receiver and to the transmitter, respectively. There is further an optical circulator having at least first, second, and third ports. The first and third ports are connected to the first and second optical fibers, respectively. There is a dispersion compensating waveguide, such as a fiber, connected to the second port, and return means connected to the dispersion compensating fiber. An optical signal going from the transmitter to the receiver passes through the dispersion compensating fiber twice. This permits approximately half of the length of dispersion compensating fiber to be used than was used previously. The return means can be implemented in several embodiments including a mirror; a grating; a fiber loop mirror; and an optical circulator having at least first, second, and third ports, and an optical fiber. The first port is connected to the dispersion compensating fiber, and the optical fiber is connected to said second and said third ports.

In a preferred embodiment, the signal is amplified by a pump laser, a multiplexer, and a fiber amplifier. The pump laser is connected to the multiplexer, and the fiber amplifier is connected between the return means and the second port of the circulator. The multiplexer is connected to the first port when the fiber amplifier is connected to the second port and to the second port when the fiber amplifier is connected to the multiplexer. In another preferred embodiment, the system is bidirectional with the optical circulator having a fourth port. The system also has a second transmitter and a second receiver with the second transmitter being connected to the second optical fiber and the second receiver being connected to the second optical fiber. There are also second return means and a second dispersion compensating fiber. The second dispersion compensating fiber is connected to the second return means and to the fourth port. The first and second dispersion compensating fibers can be separately selected to optimize system performance.

In yet another aspect of the invention, apparatus is described which has an optical circulator with at least first, second, and third ports. The apparatus further has return means and a dispersion compensating waveguide, such as a fiber, connected to the return means and to the second port. In yet another embodiment, there is an amplifier connected to the circulator. The amplifier has a pump laser, a multiplexer; and a fiber amplifier. The pump laser is connected to the multiplexer, and the fiber amplifier is connected between the return means and the second port of the circulator. The return means may use of several embodiments including a mirror; a grating; or a circulator having first, second, and third ports, and an optical fiber. In the latter embodiment, the first port is connected to the dispersion compensating fiber, and the second and the third ports are connected to the optical fiber. In yet another embodiment, the apparatus is useful in bidirectional optical communications systems with the optical circulator having a fourth port. The apparatus further has a second return means, and a second dispersion compensating fiber with the second dispersion compensating fiber being connected to the second return means and to the fourth port.

BRIEF DESCRIPTION OF THE DRAWING

Identical numerals in different FIGUREs represent identical elements.

DETAILED DESCRIPTION

The invention will be described by reference to several exemplary embodiments. Variations and other embodiments will be mentioned; still others will be apparent to those skilled in the art.

Figure 1:
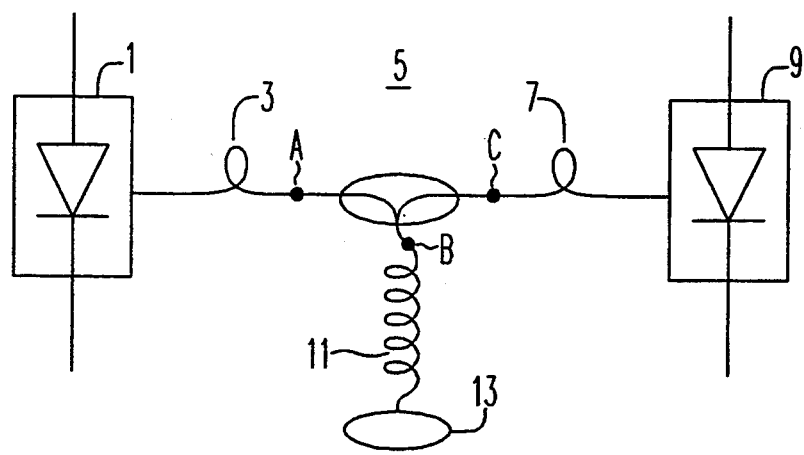
FIGS. 1-8 are schematic representations of optical communications systems and apparatus according to this invention.

Depicted in FIG. 1 are transmitter 1, First optical fiber 3, optical circulator 5, second optical fiber 7, receiver 9, dispersion compensating fiber 11, and return means 13. The transmitter 1 and receiver 9 are well known in the art and need not be described in detail. They provide the modulated radiation, typically from a semiconductor laser, and the photodetector that detects the radiation and converts it into an electrical signal. The fibers 3 and 7 are also well known in the art; they are typically silica based single mode fibers. The detailed characteristics of the fiber will depend upon the wavelength of the radiation from the receiver. These relationships are well known and appropriate choices will be readily made. The optical circulator 5 depicted is a three port circulator; it is contemplated that four port circulators can also be used. The first and second fibers 3 and 7, respectively, are connected to the first and third ports of the circulator which are shown as A and C, respectively. The DCF 11 is connected to the second port, shown as B, and to the return means 13. There are several possibilities for the return means in the embodiment depicted. A dielectric mister may be used or a grating may also be used The term return means is perhaps more accurately used than is the term mirror. The grating may be written into the fiber. The use of either linear or chirped gratings is within the scope of this invention.

Optical circulators are well known; their characteristics have been extensively discussed in the literature. A detailed discussion of their characteristics is not required for the invention to be understood and implemented. The DCF has a length that will be selected after consideration is given to the length of the first optical fiber 3. As will be apparent after operation of the system is understood, the DCF is only half as long as were prior DCFs used in similar systems.

The operation of the system depicted can be readily understood. The light from the transmitter propagates to the circulator where it enters the first port and exits from the second port. The light then passes through the DCF two times. It is returned to the circulator by the return means and reenters the circulator at the second port and leaves the circulator and enters the second fiber from the third port. The light is then received and processed at the transmitter.

Figure 2:
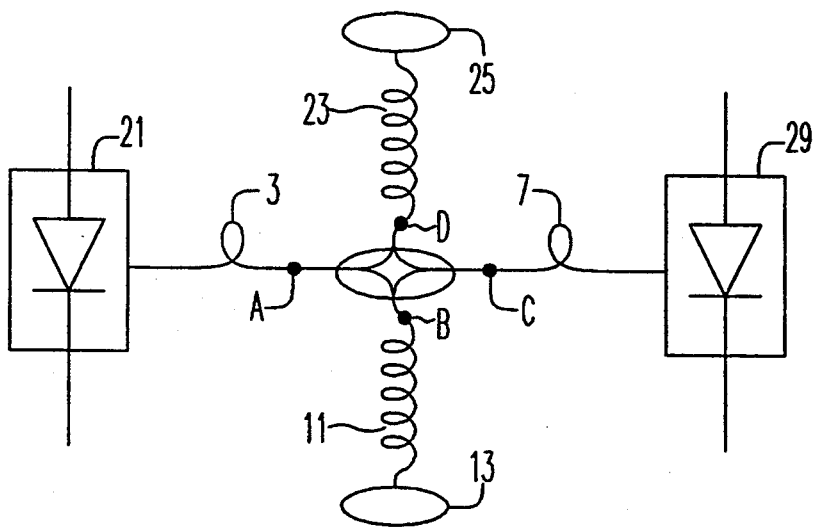

The embodiment depicted in FIG. 1 is a unidirectional system. Bidirectional systems are of interest and such a system is depicted in FIG. 2. Depicted are transceivers 21 and 29 which are connected to the first and second optical fibers, respectively. Transceivers 21 and 29 have first transmitter and second receiver and first receiver and second transmitter, respectively. The transmitters and receivers are not shown individually for reasons of clarity. The optical circulator 21 is a four port circulator with the fourth port indicated as D. There is a second DCF 23 connected to both the fourth port and the second return means 25. Transmission of signals from the transceiver 21 to the transceiver 29 is the same as for the embodiment of FIG. 1. The operation of the system when light goes from right to left is generally the same as when light goes from left to right except that the path through the circulator is different and the light goes through second DCF 23. The downstream(left to right) and upstream(right to left) wavelengths need not be the same. It will be readily appreciated that system operation may be optimized for different wavelengths. Different DCFs will be used in such circumstances.

Figure 3:
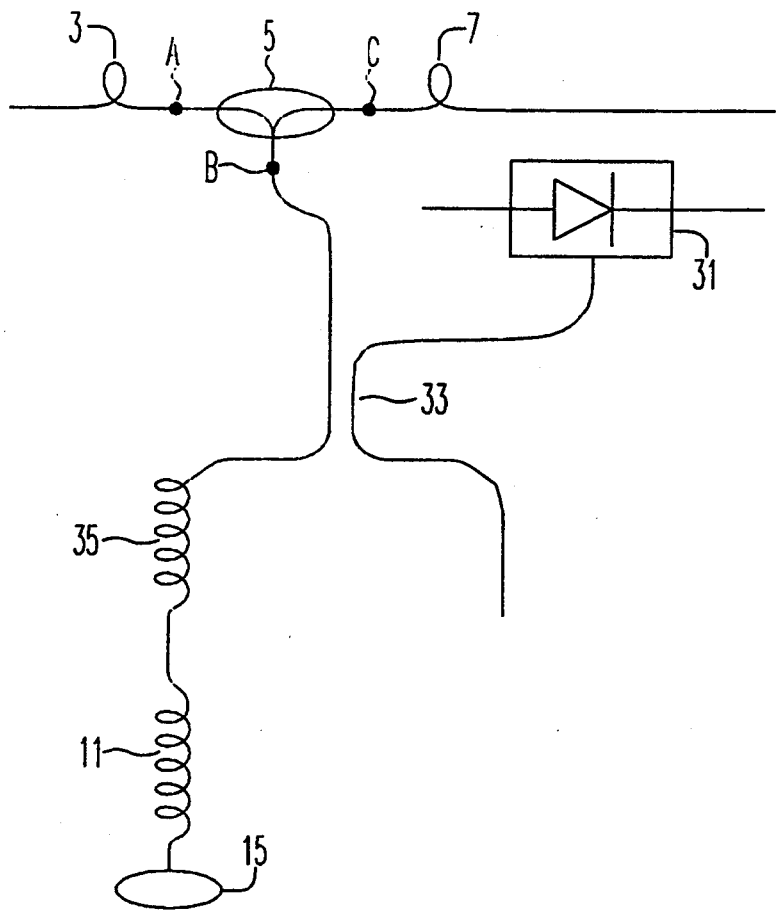
Figure 4:
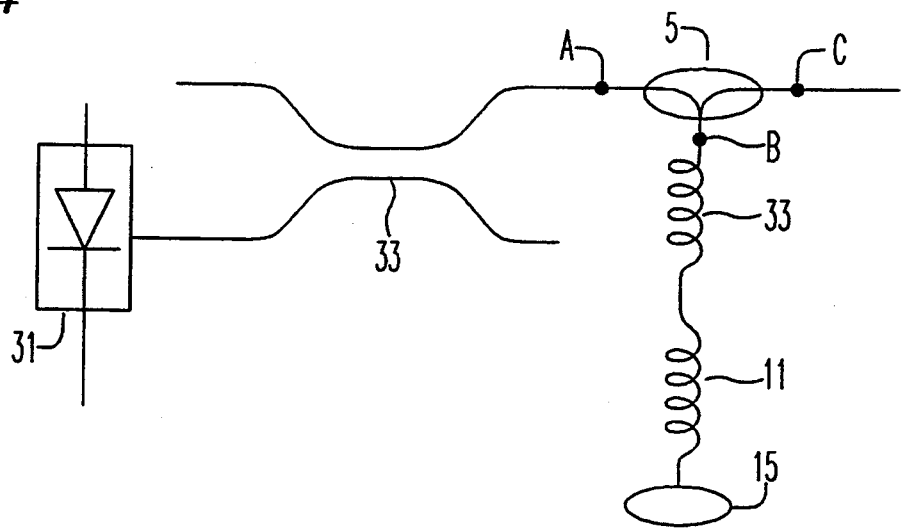

The signal received at the circulator may be relatively weak, and the use of optical amplifiers is therefore contemplated. Depicted in FIG. 3 are pump laser 31, multiplexer 33, and fiber amplifier 35. The pump laser 31 is connected to the multiplexer 33. The fiber amplifier is connected to both the multiplexer 33 and to the DCF 11. The light from the pump laser amplifies the received signal in the fiber amplifier 35, and the amplified signal then passes through the DCF twice and goes to the second port of the circulator 5. The system will be readily implemented by the skilled artisan. The pump laser and the fiber amplifier characteristics depend upon the wavelength used by the system. Another embodiment using an amplifier is depicted in FIG. 4. This embodiment is similar to that depicted in FIG. 3 except that the multiplexer 33 is connected to the first port of the circulator rather than the second port.

Figure 5:
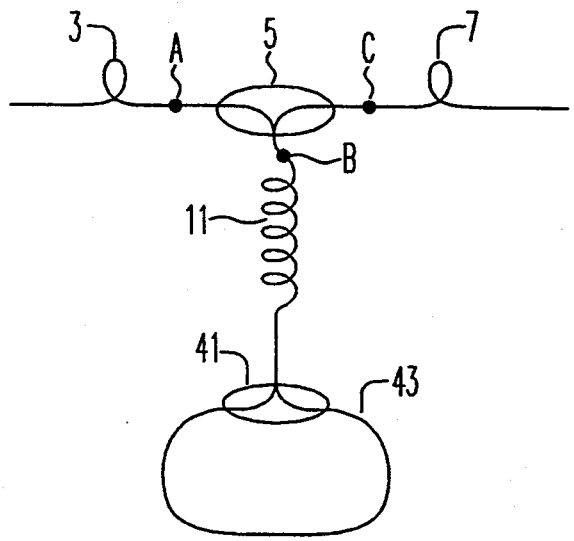

Another embodiment showing yet another return means is depicted in FIG. 5. In this embodiment, there is a three port optical circulator 41 with its second port connected to the dispersion compensating fiber 11. An optical fiber is connected to the first and third ports enabling the signal to return through the dispersion compensating fiber 11 to circulator 5 and then to system fiber 7. Additional function may be inserted in the loop. For example, there may be filter, amplifier, etc.

Figure 6:
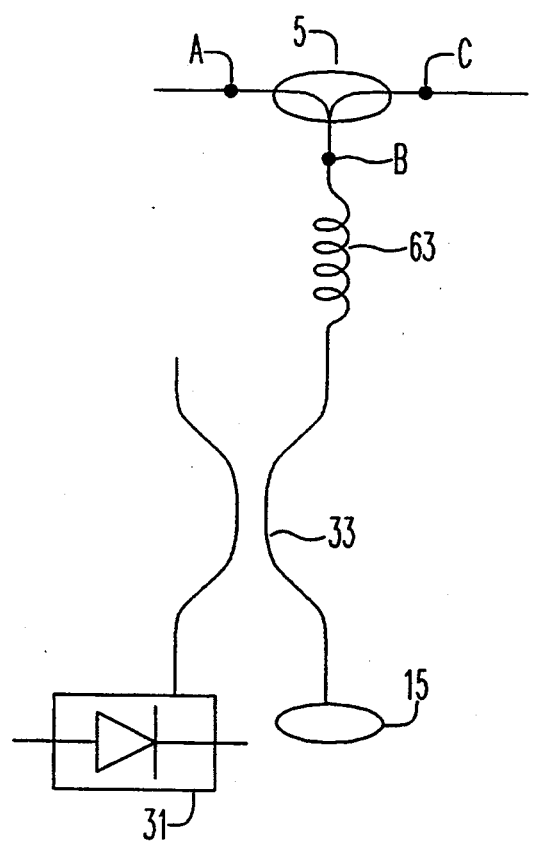

The dispersion compensating fiber may also be doped with rare earth ions and function as a fiber amplifier. Such an embodiment is depicted in FIG. 6 with the Er doped DCF shown as element 63. When pumped, this fiber provides dispersion compensation while counteracting propagation loss with gain. Operation will be readily understood without detailed explanation.

Figure 7:
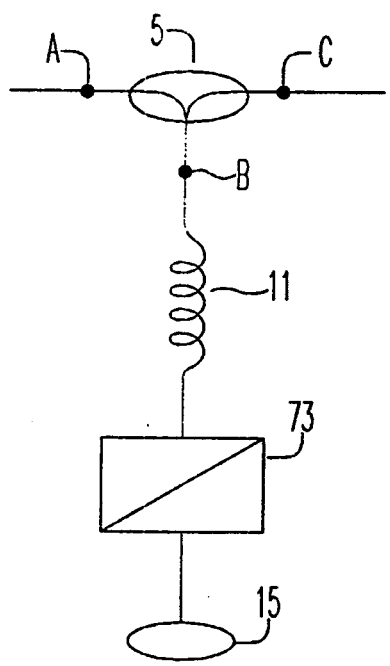

Reflection or return of light through the DCF has previously been mentioned as advantageous because it reduces the amount of DCF required for the system. There is another advantage of having the light pass twice through the DCF which will be apparent from consideration of FIG. 7. In addition to elements previously depicted, there is also a Faraday rotator 73. Although the rotator and mirror are shown as separate, discrete elements, their functions may be combined in a single element. The rotator rotates the polarization by 90 degrees and compensates for polarization mode dispersion of the optical components undergoing the second pass. The components include the DCF, the fiber amplifier, the multiplexer, etc.

Figure 8:
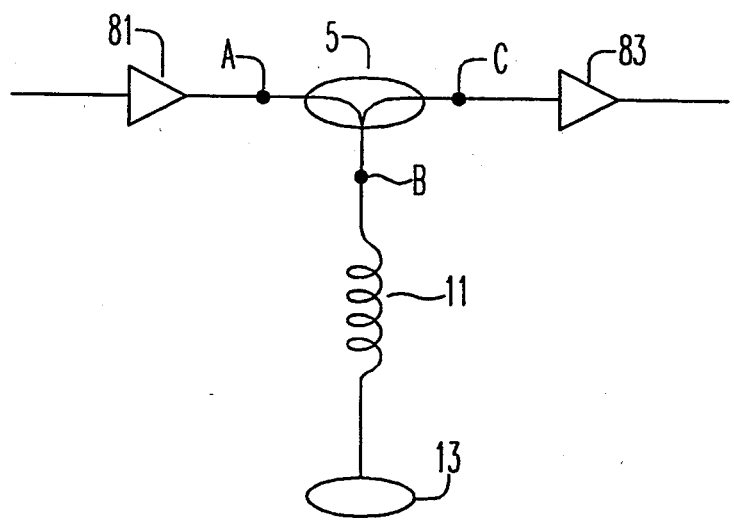

The DCF has relatively high losses, and it may be desirable to amplify the signal before it goes through this fiber. Such apparatus is shown in FIG. 8 which has a preamplifier 81 and a power amplifier 83. These components are well-known to these skilled in the art. This embodiment should result in a improved signal-to-noise ratio as compared to the embodiments that do not have preamplifier 81 and power amplifier 83. Either or both preamplifier 81 and power amplifier 83 may use fiber amplifiers. These fiber amplifiers may be remotely pumped by light sources in the transmitter or receiver.

Variations in the embodiments described are contemplated. For example, the multiplexer and pump laser depicted in FIG. 3 may be connected to the second port of the optical circulator rather than the first port. Additionally, the signals may be amplified in bidirectional systems for single or multiple wavelengths. Furthermore, although the description has been in terms of fibers, other types of waveguides may be used.

We claim:

1. An optical communications system comprising:
   a first transmitter;
   a first receiver;
   first and second optical fibers connected to said first transmitter and said first receiver, respectively;
   an optical circulator having at least first, second, and third ports, said first and third ports connected to said first and said second optical fibers, respectively;
   a first dispersion compensating waveguide connected to said second port; and
   first return means connected to said first dispersion compensating waveguide, said returns means returning a signal to said circulator through said dispersion compensating waveguide.

2. An optical communications system as recited in claim 1 in which first said return means comprises reflecting means.

3. An optical communications system as recited in claim 1 in which said first return means comprises a grating.

4. An optical communications system as recited in claim 1 in which said first return means comprises an optical circulator having at least first, second, and third ports, and an optical fiber; said first port being connected to said first dispersion compensating waveguide, and said optical fiber being connected to said second and said third ports.

5. An optical communications system as recited in claim 1 further a pump laser, a multiplexer, and a fiber amplifier, said pump laser being connected to said multiplexer, and fiber amplifier being connected between said return means and said second port of said circulator, said multiplexer being connected to said first port when said fiber amplifier is connected to said second port and to said second port when said fiber amplifier is connected to said multiplexer.

6. An optical communications system as recited in claim 1 in which said optical circulator has a fourth port.

7. An optical communications system as recited in claim 6 further comprising a second transmitter and a second receiver; said second transmitter being connected to said second optical fiber and said second receiver being connected to said first optical fiber.

8. An optical communications system as recited in claim 7 further comprising second return means and a second dispersion compensating waveguide; said second dispersion compensating waveguide being connected to said second return means and to said fourth port.

9. An optical communications system as recited in claim 1 further comprising a Faraday rotator connected to said dispersion compensating waveguide and said return means.

10. An optical communications system as recited in claim 1 further comprising a preamplifier connected between said optical circulator and said transmitter.

11. An optical communications system as recited in claim 10 further comprising a light source in said transmitter for pumping said preamplifier.

12. An optical communications system as recited in claim 1 further comprising an amplifier connected between said optical circulator and said receiver.

13. An optical communications system as recited in claim 12 in which said amplifier is remotely pumped by a light source in said receiver.

14. Apparatus comprising:
    an optical circulator having at least first, second, and third ports;
    return means; and
    a first dispersion compensating waveguide, said waveguide being connected to said return means and to said second port, said returns means returning a signal to said circulator through said dispersion compensating waveguide.

15. Apparatus as recited in claim 14 further comprising:
    a pump laser;
    a multiplexer; and
    a fiber amplifier, said pump laser being connected to said multiplexer, and fiber amplifier being connect between said return means and said second port of said circulator, said multiplexer being connected to said first port when said fiber amplifier is connected to said second port and to said second port when said fiber amplifier is connected to said multiplexer.

16. Apparatus as recited in claim 14 in which said return means comprises reflecting means.

17. Apparatus as recited in claim 14 in which said return means comprises a grating.

18. Apparatus as recited in claim 14 in which said return means comprises a circulator having first, second, and third ports; and an optical fiber, said first port being connected to said dispersion compensating waveguide, and said optical fiber being connected to said second and said third ports.

19. Apparatus as recited in claim 14 in which said optical circulator has a fourth port.

20. Apparatus as recited in claim 17 further comprising a second return means, and a second dispersion compensating waveguide, said second dispersion compensating waveguide being connected to said second return means and to said fourth port.

21. Apparatus as recited in claim 14 further comprising a Faraday rotator connected to said dispersion compensating waveguide and to said return means.

* * * * *